United States Patent
Yarlagadda

(10) Patent No.: US 7,313,133 B2
(45) Date of Patent: Dec. 25, 2007

(54) SELECTING A NETWORK BASED ON METRICS FOR REAL TIME COMMUNICATION

(75) Inventor: Madhu Yarlagadda, Los Altos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 252 days.

(21) Appl. No.: 11/128,519

(22) Filed: May 12, 2005

(65) Prior Publication Data

US 2006/0268828 A1 Nov. 30, 2006

(51) Int. Cl.
*H04L 12/66* (2006.01)
(52) U.S. Cl. ............... 370/352; 370/401; 370/238; 455/445
(58) Field of Classification Search ........... 370/352, 370/238, 353, 466, 467
See application file for complete search history.

(56) References Cited

U.S. PATENT DOCUMENTS

| | | | |
|---|---|---|---|
| 5,758,088 A | 5/1998 | Bezaire et al. | |
| 6,021,433 A | 2/2000 | Payne et al. | |
| 6,167,426 A | 12/2000 | Payne et al. | |
| 6,567,419 B1 | 5/2003 | Yarlagadda | |
| 6,665,293 B2 * | 12/2003 | Thornton et al. | 370/352 |
| 6,735,614 B1 | 5/2004 | Payne et al. | |
| 2003/0219011 A1 * | 11/2003 | Han | 370/352 |
| 2004/0032860 A1 | 2/2004 | Mundra et al. | |
| 2004/0047345 A1 * | 3/2004 | Joseph et al. | 370/352 |
| 2004/0109023 A1 * | 6/2004 | Tsuchiya | 345/758 |
| 2004/0160979 A1 | 8/2004 | Pepin et al. | |
| 2005/0091407 A1 * | 4/2005 | Vaziri et al. | 709/246 |
| 2005/0117605 A1 * | 6/2005 | Yan et al. | 370/469 |
| 2006/0256780 A1 * | 11/2006 | Diroo et al. | 370/356 |

FOREIGN PATENT DOCUMENTS

| | | |
|---|---|---|
| EP | 1 161 038 A2 | 12/2001 |
| WO | WO 01/78430 | 10/2001 |

* cited by examiner

*Primary Examiner*—Matthew D. Anderson
*Assistant Examiner*—Sanh Phu
(74) *Attorney, Agent, or Firm*—Darby & Darby PC; Thomas R. Marquis

(57) ABSTRACT

A system, method, and apparatus are directed towards routing a Voice over IP (VOIP) messages over a network. The VOIP messages are sent by a source client device to a destination client device through a portal service that has access to multiple routing services such as peering partners, carriers, etc. A VOIP system of the portal service aggregates call quality data after each VOIP call over each routing service. The call quality data is analyzed to determine a perception factor for each routing service at various times of day, days of the week, day of the year, geographic areas, and the like. When a VOIP call is requested through the portal service, the VOIP system determines a current cost, a current quality of service, and the perception factor for each routing service. A weighting is applied to each criterion and a routing service is selected for routing the VOIP call.

26 Claims, 5 Drawing Sheets

SELECTING A NETWORK BASED ON METRICS FOR REAL TIME COMMUNICATION

BACKGROUND OF THE INVENTION

The present invention relates generally to network communications, and more particularly, but not exclusively, to a system and method for selecting a network routing service to route audio communications.

IP Telephony, also known as Voice over Internet Protocol (VOIP), is a technology that makes it possible to have a voice conversation over a dedicated IP network, such as the Internet, instead of a dedicated voice transmission line.

Depending on the service, one way to place a VOIP call is to employ specialized phones, sometimes called IP Phones, or VOIP phones, that may look like a normal phone. Such VOIP phones may connect to the network through an RJ-45 connector, or operate through a wireless connection.

Because VOIP make it possible to have voice conversations over IP networks, VOIP allows for a cost effective alternative to the traditional public switched telephone networks (PSTNs). Because of its relatively lower costs and ease of use, VOIP phone services have been rapidly increasing in popularity. With such an increase in popularity, there has been an increased desire to route VOIP calls in a cost effective manner yet maintain voice quality. It is also desired to integrate at least some of the VOIP features with a variety of other communication services.

VOIP calls can be routed over existing PSTN carrier networks via Internet service providers (ISPs). However, independent VOIP service providers generally do not have control over PSTN carrier traffic, costs, quality, and/or other factors. Consequently, many implementations of VOIP face problems dealing with latency and/or possible data integrity issues that are beyond control of an independent VOIP service provider. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed towards a system, method, and apparatus for routing Voice over IP (VOIP) messages over a network based on current and/or past cost and quality data. A VOIP call may be requested through a service provider that may be independent of any carrier networks. The service provider can monitor the various carrier networks, and select a routing based on the current and/or past cost and quality data. The VOIP messages may employ the Real-time Transport Protocol (RTP) and Session Initiation Protocol (SIP) over the Transmission Control Protocol (TCP). In one embodiment, VOIP messages that initially employ RTP (and possibly SIP) over the User Datagram Protocol (UDP) are translated to use the TCP protocol. By employing the TCP transport protocol the invention may improve the likelihood that the VOIP message will be routed through a firewall, NAT, and the like.

Illustrative Operating Environment

Figure 1:
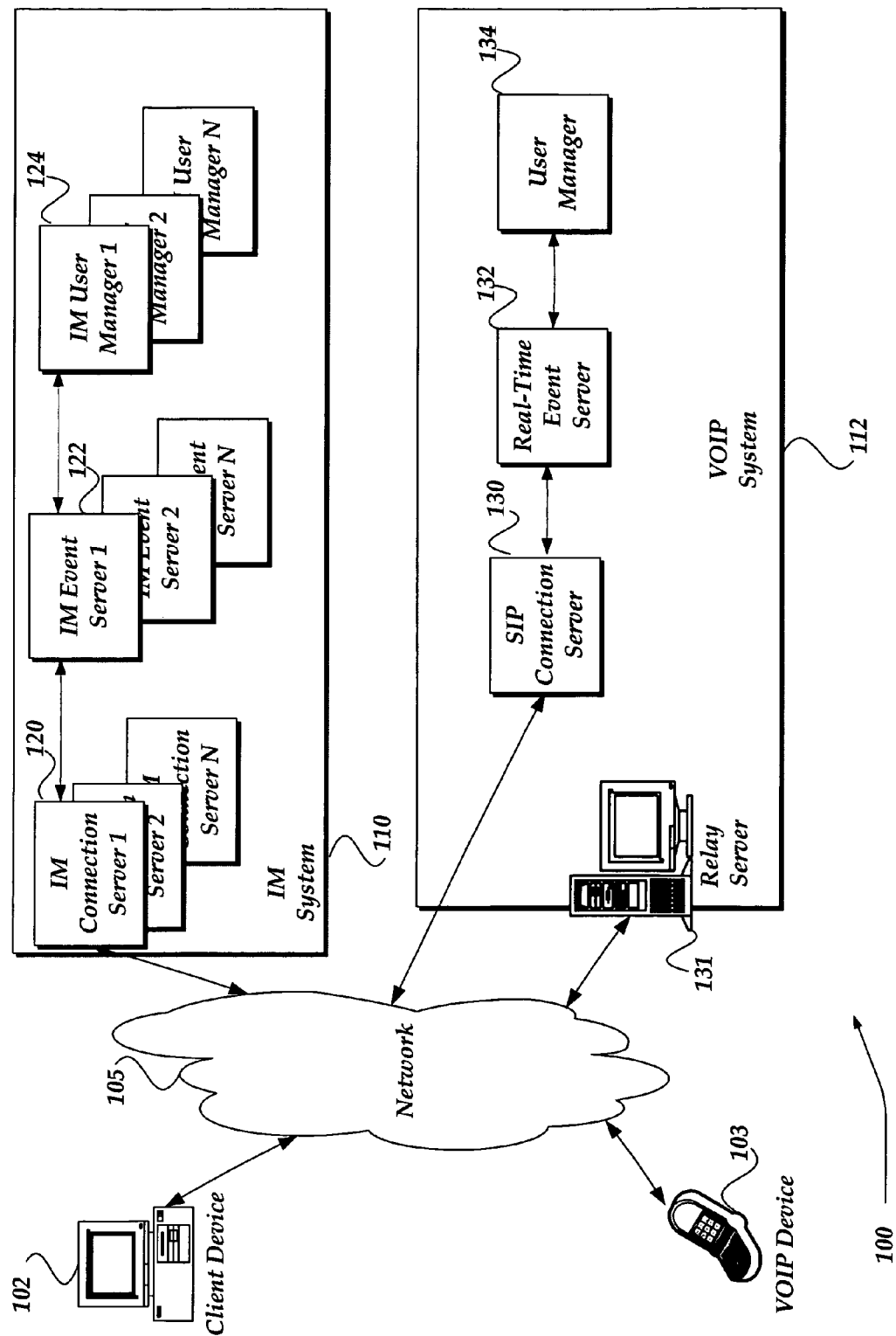
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client device 102, VOIP device 103, network 105, IM system 110, and VOIP system 112. IM system 110 may include IM connection servers 120, IM event servers 122, and IM user managers 124. VOIP system 112 includes relay server 131, SIP connection server 130, Real-Time event server 132, and user manager 134.

Client device 102 is in communication with IM connection servers 120, SIP connection server 130, and relay server 131 through network 105. VOIP device 103 is in communication with IM connection servers 120, SIP connection server 130, and relay server 131 through network 105. IM event servers 122 are in communication with IM connection servers 120 and IM user managers 124. Real-time event server 132 is in communication with SIP connection server 130 and user manager 134.

VOIP device 103 may include virtually any device that is arranged to send and receive media communications and messages such as VOIP messages via one or more wired and/or wireless communication interfaces. For example, VOIP device 103 may be configured to send and/or receive VOIP messages between client device 102 through relay server 131.

Typically, VOIP device 103 may be configured to communicate using any of a variety of protocols. For example, VOIP device 103 may be configured to employ RTP for communicating media data such as audio and video to another device. However, the invention is not so limited, and another media data mechanism may be employed, including IAX, and the like. VOIP device 103 may also employ the SIP protocol for enabling setting up a session and enabling such actions as dialing a number, enabling a ring, a ring-back tone, busy signal, and the like. However, other signaling protocols may also be employed, including H.323, Skinny Client Control Protocol (SCCP), IAX, MiNET, and the like. Typically, however, VOIP device 103 may employ SIP over either UDP or TCP and RTP over UDP.

VOIP device 103 may also be configured to provide an identifier, sometimes known as an originating line identifier (OLI) during a communication. The identifier may employ any of a variety of mechanisms, including a device model number, a carrier identifier, a mobile identification number (MIN), and the like. The MIN may be a telephone number, a Mobile Subscriber Integrated Services Digital Network (MS-ISDN), an electronic serial number (ESN), or other device identifier. The OLI may also be an IP address associated with VOIP device 103. In one embodiment, the identifier is provided with each communication. In another embodiment, the identifier is provided by an end-user.

Devices that may operate as VOIP device 103 include personal computers, desktop computers, smart phones, Personal Digital Assistants (PDAs), handheld computers, programmable consumer electronics, standard telephones configured with an analog telephone adaptor (ATA), an IP phone, a mobile device, and the like.

Client device 102 may include virtually any computing device capable of receiving and sending a message over a network. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client device 102 may be any device that is capable of connecting using a wired or wireless communication medium such as a PDA, POCKET PC, wearable computer, and any other device that is equipped to communicate over a wired and/or wireless communication medium.

Client device 102 may be further configured to receive a VOIP message in one format and to provide the message over network 105 in another format to a remote device such as IM connection servers 120, relay server 131, SIP connection server 130, and the like. Client device 102 may employ a local proxy agent (not shown) that is configured to receive the VOIP message and determine whether the message is to be transformed to such as the UDP protocol. If the message is employing the UDP protocol, the local proxy agent may convert the message format to another transport protocol, such as TCP, or the like. Client device 102 may also manage the message using an IM client (not shown). In one embodiment, the local proxy agent is integrated within the IM client. The local proxy agent may also transform the message using a port translation, packet encapsulation, or the like.

Client device 102 may further be configured to send the message over network 105 to IM connection servers 120, SIP connection server 130, relay server 131, and the like. Upon receipt of a response, such as from IM connection servers 120, SIP connection server 130, relay server 131, and the like, the local proxy agent may perform actions that may convert the received response into another format. For example, the local proxy agent may convert a response employing RTP over TCP, or the like, to RTP over UDP, or the like.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 may include any communication method by which information may travel between computing devices.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

IM system 110 is configured to manage IM sessions between client devices employing an IM client. IM system 110 may employ IM connection servers 120, IM event servers 122, and IM user managers 124 to manage one or more IM sessions. In one embodiment, IM connection servers 120, IM event servers 122, and IM user managers 124 may represent separate server processes operating with a single computing device. In another embodiment, IM connection servers 120, IM event servers 122, and IM user managers 124 may represent distinct processes operating across multiple computing devices. As such, IM system 110 may be implemented on a variety of computing devices including personal computers, desktop computers, multiprocessor systems, microprocessor-based devices, network PCs, servers, network appliances, and the like.

IM connection servers 120 are configured to receive a request to establish an IM session from an IM client, such as might be included within client device 102, VOIP device 103, and the like. IM connection servers 120 may also receive from the IM client authentication information that may be employed to authenticate an end-user of the IM client. If the end-user is authenticated, IM connection servers 120 may enable the IM client to log into the IM session. IM connections servers 120 may also be configured to provide information about the established session to IM event servers 122.

IM connections servers 120 may also forward various request information from the IM client to IM event servers 122. Such request information may include, for example, a request to locate and communicate with another IM end-user.

IM event servers 122 are configured to receive the end-user's log in and other request information from IM connections servers 120. IM event servers 122 may request IM user managers 124 to store information about the IM client and end-user. IM user mangers 124 may employ a table, spreadsheet, file, database, and the like, to register the IM client, and on which IM connection server, within IM connection servers 120, the IM client is logged into. Thus, IM user managers 124 may store information about various IM conversations that may include such information as identifiers for end-users associated with an IM conversation, time information, account identifiers for the end-users, IM connection servers associated with an IM conversation, and so forth. As such, IM event servers 122 may also employ IM user managers 124 to determine which IM connection server, within IM connection servers 122, another end-user is logged into, and provide such information to IM connection servers 120, so that an IM session may be established between two or more IM end-users.

VOIP system 112 is configured to manage VOIP sessions between client devices using any of a variety of VOIP protocols. VOIP system 112 is further configured to enable a variety of client devices and client applications to access voice mail messages.

As shown, VOIP system 112 may be implemented in a single computing device, with each of the illustrated components operating as one or more processes with the single computing device. VOIP system 112 may also be implemented across multiple computing devices, with one or more of the illustrated components distributed across the multiple computing devices. As such VOIP system 112 may be implemented on a variety of computing devices including personal computers, desktop computers, multiprocessor systems, microprocessor-based devices, network PCs, servers, network appliances, and the like.

Briefly, relay server 131 is configured to manage messages, such as media messages between one computing device and another, such as client device 102, VOIP device 103, and the like. Relay server 131 may, for example, receive a VOIP packet, such as a TCP/IP packet and save the packet in a buffer until it may be relayed towards a destination device. Relay server 131 may also be configured to monitor flow congestion, quality of service characteristics, and the like, associated with a communication between itself and the destination device, and/or the source device. When the communication is considered to have degraded, such as might result from a predefined number of packet retransmits, relay server 131 may provide an indication of the degradation to the source device. In one embodiment, the indication of degradation is provided through a Real-time Transport Control Protocol (RTCP) report. The RTCP report may be initiated by the destination device and/or relay server 131. The source device may then be configured to employ the RTCP report, or similar indication of degradation to adjust its transmission of VOIP packets.

Devices that may operate as relay server 131 include personal computers, desktop computers, multiprocessor systems, microprocessor-based or programmable consumer electronics, network PCs, servers, firewalls, gateways, network address translators, bridges, routers, and the like.

SIP connection server 130 is configured to receive a request to establish a SIP connection from client device 102, VOIP device 103, and the like. The requesting device may provide identification information to SIP connection server 130 that may be used, at least in part, to authenticate the request to establish the SIP connection. If the requesting device is authenticated, SIP connection server 130 may enable the requesting device to log into a connection. SIP connection server 130 may also provide information about the requesting device to real-time event server 132. Real-time event server 132 may be configured to receive the information and provide it to user manager 134 for storage.

User manager 134 may store the information in a database, spreadsheet, table, file, and the like. Such information may include, for example, an identifier associated with the requesting device, an end-user associated with the requesting device, an address associated with SIP connection server 130, and the like. User manager 134 may receive and manage such information for a plurality of requesting device. User manager 134 may also provide information to real-time event server 132 about at least one other requesting device, such that SIP connection server 130 may enable a VOIP communication between one or more end-user devices. In one embodiment, the one or more end-user devices may employ relay server 131 to relay the VOIP communications between them. User manager 134 may also determine routing of VOIP communications between end-user devices.

Illustrative Network Environment

Figure 2:
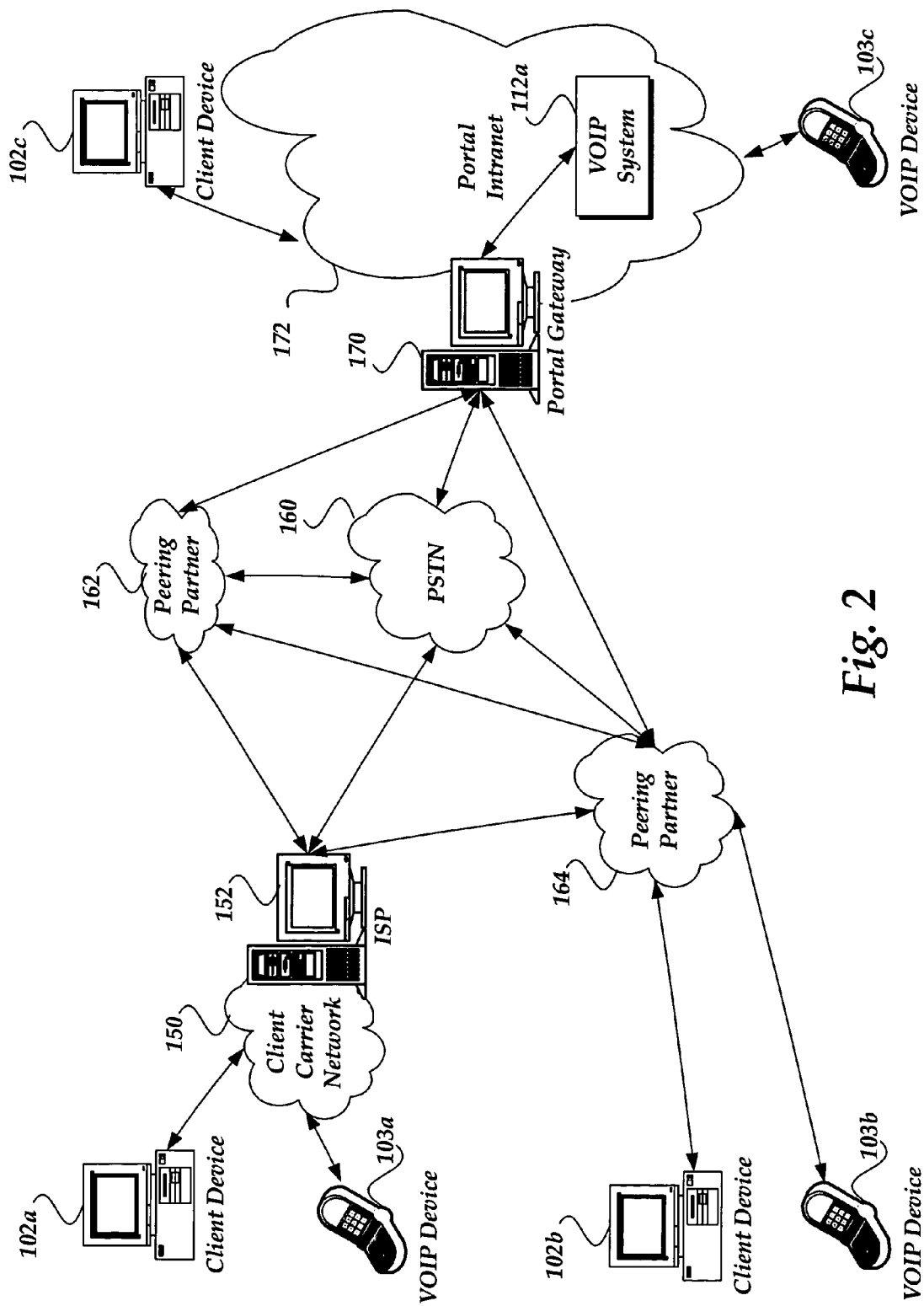
FIG. 2 shows a functional block diagram illustrating one embodiment of network environment through which the invention may be practiced.

FIG. 2 illustrates one embodiment of a functional network environment in which the invention may operate. Client devices may communicate through a variety of routing services to hold VOIP calls with each other. For example, client devices 102a and 103a may communicate through a client carrier network 150 to an ISP 152, which may be part of, or separate from, the client carrier network. Client carrier network 150 may comprise a telephone network and/or a cable network, such as that provided by Comcast Cable Communication, LLC, Adelphia Communications Corp., and the like. Client carrier network 150 and/or ISP 152 may communicate through one or more first tier ISPs (sometimes referred to as internet backbones) (not shown), such as those provided by MCI, Inc., Level 3 Communications, Inc., Sprint Corp., and the like. ISP 152 may also communicate through other ISPs, a PSTN 160, and/or a peering partner, such as peering partners 162 and 164. Although not so limited, peering partners generally comprise ISPs and/or network carriers with which a party communicates via dedicated communication services, such as dedicated communication lines, privately leased lines, virtual private networks (VPNs), and the like.

The above sample infrastructure enables the client devices to communicate with a desired portal service that may provide VOIP services. The portal service may also provide IM services, search services, and/or other services. The portal service may generally include one or more gateways, such as a portal gateway 170 to a portal intranet 172. Within the portal intranet, a VOIP system 112a determines further routing of a VOIP call to a destination client device. Some VOIP calls may be between a client device and a destination device that are within the portal intranet, such as between client device 102c and VOIP device 103c. In that case, the portal VOIP system may simply route the VOIP call within the intranet, without accessing any outside network.

For VOIP calls that involve at least one client device outside the portal intranet, the portal VOIP system determines which network over which to route the call, based on predefined settings, current network conditions, accumulated call quality data, and/or other information. For instance, PSTN 160 may have a relatively high quality of service, but a large cost and a history of difficulty in establishing connections. The VOIP system may determine that peering partner 164 has been more reliable in establishing connections, is less expensive, and currently has less traffic. The VOIP system may then chose to route the VOIP call via peering partner 164. Some peering partners may comprise ISPs that have arranged dedicated communication services with the portal service. Example peering partner ISPs include those provided by Microsoft Corp. (e.g., MSN), America Online, Inc., EarthLink, Inc., and the like. Other peering partners may comprise network carriers that have arranged dedicated communication services with the portal service. Example peering partner carriers include Verizon Communications, Inc., SBC Communications, Inc., and the like. Peering partners may include international ISPs and other service providers as well.

The selected route may involve communication with internet backbones, ISPs, and/or client carrier networks. For instance, a VOIP call may be routed to peering partner 164, which may or may not includes an intermediate ISP. The peering partner may transmit the VOIP call over a digital subscriber line (DSL) network and/or other carrier network to reach a destination device, such as client device 102b or VOIP device 103b.

Illustrative Client Environment

Figure 3:
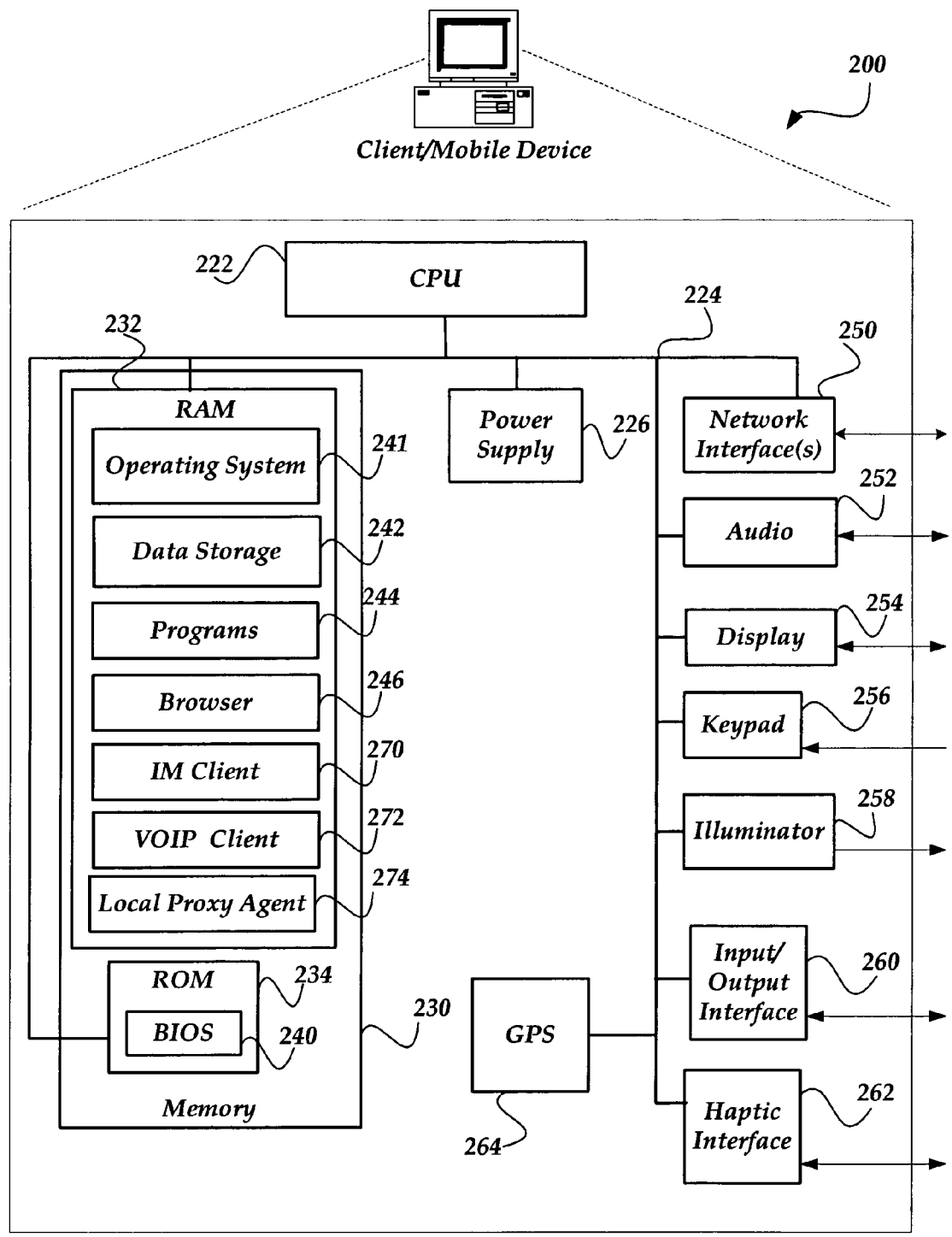
FIG. 3 shows one embodiment of a server device that may be included in a system implementing the invention.

FIG. 3 shows one embodiment of client device 200 that may be included in a system implementing the invention. Client device 200 may include many more or less components than those shown in FIG. 3. However, the components shown are sufficient to disclose an illustrative embodiment for practicing the present invention. As shown in the figure, client device 200 includes a processing unit 222 in communication with a mass memory 230 via a bus 224.

Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, and the like.

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 3. Input/output interface 260 can utilize one or more communication technologies, such as USB, infrared, Bluetooth™, and the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS and the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 242, which can be utilized by client device 200 to store, among other things, programs 244 and/or other data. For example, data storage 242 may also be employed to store information that describes various capabilities of client device 200. The information may then be provided to another device based on any of a variety of events, including being sent as part of a header during a communication, sent upon request, and the like.

Programs 244 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, contact managers, task managers, transcoders, database programs, word processing programs, spreadsheet programs, games, codec programs, and so forth. In addition, mass memory 230 stores browser client 246, IM client 270, VOIP client 272, and local proxy agent 274.

Browser 246 may be configured to receive and to send web pages, web-based messages, and the like. Browser 246 may, for example, receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

IM client 270 may be configured to initiate and manage an instant messaging session. In one embodiment, IM client 270 is configured to employ a VOIP client, such as VOIP client 272 to integrate IM/VOIP features. Thus, in one embodiment, IM client 270 may employ SIP to establish media sessions with another computing device employing an IM/VOIP capable client, and RTP to communicate the media traffic. However IM client 270 is not so limited. For example, IM client 270 may also employ any of the following SIMPLE (SIP for Instant Messaging and Presence Leverage), APEX (Application Exchange), Prim (Presence and Instant Messaging Protocol), the open XML-based XMPP (Extensible Messaging and Presence Protocol), more commonly known as Jabber and OMA(Open Mobile Alliance)'s IMPS (Instant Messaging and Presence Service) created specifically for mobile devices, and the like.

VOIP client 272 is configured to enable client device 200 to initiate and manage a VOIP session with another client device. VOIP client 272 may employ the SIP protocol for managing signaling, and RTP for transmitting the VOIP traffic ("media"). However, the invention is not so constrained, and any of a variety of other VOIP protocols may be employed including IAX which carries both signaling and voice data, H.323, SCCP, Megaco, MGCP, MiNET, Skinny Client Control Protocol (SCCP),and the like. VOIP client 272 is further configured to employ virtually any media codec to compress the media stream for communicating it over the network, including G.711, G.729, G.729a, iSAC, Speex, and the like. In one embodiment, SIP may be employed to enable a Session Description Protocol (SDP).

VOIP client 272 may further be configured to receive VOIP data and signals from another device, and may then provide, at least the media data (RTP) traffic, and perhaps the SIP portion, to local proxy agent 274 for possible conversion.

VOIP client 272 may be further configured to manage a flow of VOIP packets to and/or from another computing device. In one embodiment, VOIP client 272 may employ these components to provide the packets using RTP with RTCP. VOIP client 272 may employ an RTCP report from a destination device to determine various qualities of communications, including flow control, congestion control, quality of service, and the like. VOIP client 272 may, for example, determine, based at least in part, on the RTCP report that it may want to modify its transmission of the RTP packets. Thus, in one embodiment, VOIP client 272 may elect to employ a lower speed codec, or the like. Such actions by VOIP client 272 are directed towards reducing a number of packets transmitted, and/or otherwise slowing down the flow of packets. This may provide the destination device a sufficient opportunity to catch-up. The invention is not limited to modifying the codecs, however, and virtually any other mechanism may be employed to modify the transmission of packets, without departing from the scope or spirit of the invention.

Although not shown, client device 200 may also be configured to receive a message from another computing device, employing another mechanism, including, but not limited to email, Short Message Service (SMS), Multimedia Message Service (MMS), internet relay chat (IRC), mIRC, and the like.

Local proxy agent 274 is configured to receive a VOIP message and, as appropriate, convert it to another format. For example, local proxy agent 274 may receive a VOIP message that employs the SIP/RTP protocols. Local proxy agent 274 may examine a transport protocol used by the received VOIP message to determine if it is UDP, TCP, or the like. Local proxy agent 274 may then be further configured to convert the message, if it employs the UDP protocol. Local proxy agent 274 may, for example, convert the message to SIP over TCP and RTP over TCP. Local proxy agent 274 may further perform a port translation such that the message may be forwarded over a predefined port number, and thereby further transliterating the message onto a port that is configured to operate with a destination device. Local proxy agent 274 may also enable the converted message to be sent towards its destination over a network, such as network 105 of FIG. 1. Furthermore, local proxy agent 274 may also send the converted message to VOIP client 272 to be sent by it over the network.

Local proxy agent 274 also may employ any of a variety of other conversions, transformations, and the like, upon the received message. For example, in one embodiment, local proxy agent 274 may receive the message and encapsulate it into another message format that is enabled to operate within a tunnel. Thus, in one embodiment, local proxy agent 274 may encapsulate the message into a format capable of running over an HTTP connection, an IM protocol connection, and the like.

Similarly, local proxy agent 274 may also be configured to receive a response to the message and, as appropriate, convert the response to another format. For example, the response may be configured as SIP/RTP over TCP. Local proxy agent 274 may convert this response to be RTP over UDP, and SIP over UDP or TCP, as appropriate for the destination device. Local proxy agent 274 may employ processes such as described below in conjunction with FIG. 5 to perform at least some of the above actions. Moreover, as mentioned above, local proxy agent 274 may be integrated within IM client 270. However, the invention is so constrained. For example, local proxy agent 274 may also be integrated with VOIP client 272, or any other combination of the above components may be arranged, without departing from the scope or spirit of the invention.

Illustrative Server Environment

Figure 4:
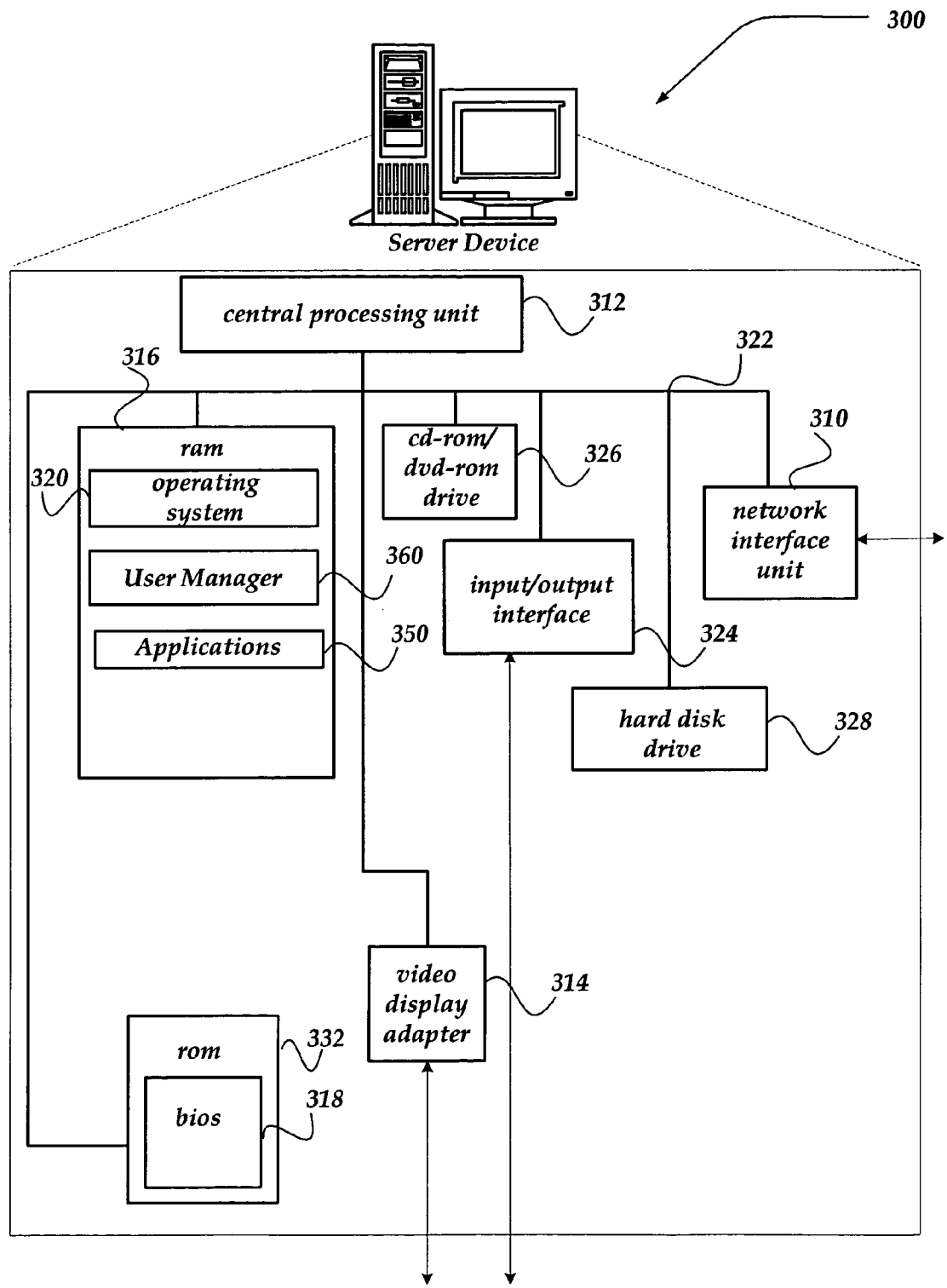
FIG. 4 shows one embodiment of a server device that may be included in a system implementing the invention.

FIG. 4 shows a server device, according to one embodiment of the invention. Server device 300 may include many more components than those shown. The components shown, however, are sufficient to disclose an illustrative embodiment for practicing the invention. Server device 300 may be, for example, a user manager server and/or other server of the VOIP system. Client devices, VOIP devices, mobile devices, and/or other end-user devices may alternatively be configured substantially similar to server device 300.

Server device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of server device 300. Any general-purpose, or special purpose operating system may be employed. Basic input/output system ("BIOS") 218 is also provided for controlling the low-level operation of server device 300. As illustrated in FIG. 4, server device 300 also can communicate with the Internet, or some other communications network, such as network 105 in FIG. 1, via network interface unit 310, which is constructed for use with various communication protocols including the TCP/IP protocol. Network interface unit 310 is sometimes known as a transceiver, transceiving device, network interface card (NIC), and the like.

Server device 300 also includes input/output interface 324 for communicating with external devices, such as a mouse, keyboard, scanner, or other input devices not shown in FIG. 4. Likewise, server device 300 may further include additional mass storage facilities such as CD-ROM/DVD-ROM drive 326 and hard disk drive 328. Hard disk drive 328 is utilized by server device 300 to store, among other things, application programs, databases, and the like.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs include email programs, schedulers, calendars, transcoders, database programs, word processing programs, spreadsheet programs, and so forth. Server device 300 may also include an SMTP handler application for transmitting and receiving email. Server device 300 may further include an HTTP handler application for receiving and handing HTTP requests, and an HTTPS handler application for handling secure connections. The HTTPS handler application may initiate communication with an external application in a secure fashion. Mass storage may also include applications such as user manager 360. User manager 360 is configured to perform a plurality of operations, including select a routing within a network or via one of a plurality of backbone carriers.

In one embodiment, user manager 360 may be integrated within operating system 320. However, the invention is not limited to such an arrangement. As such, user manager 360 may also be configured as a distinct application, as an application, firmware, or the like integrated within network interface unit 310, and the like.

Generalized Operation

Figure 5:
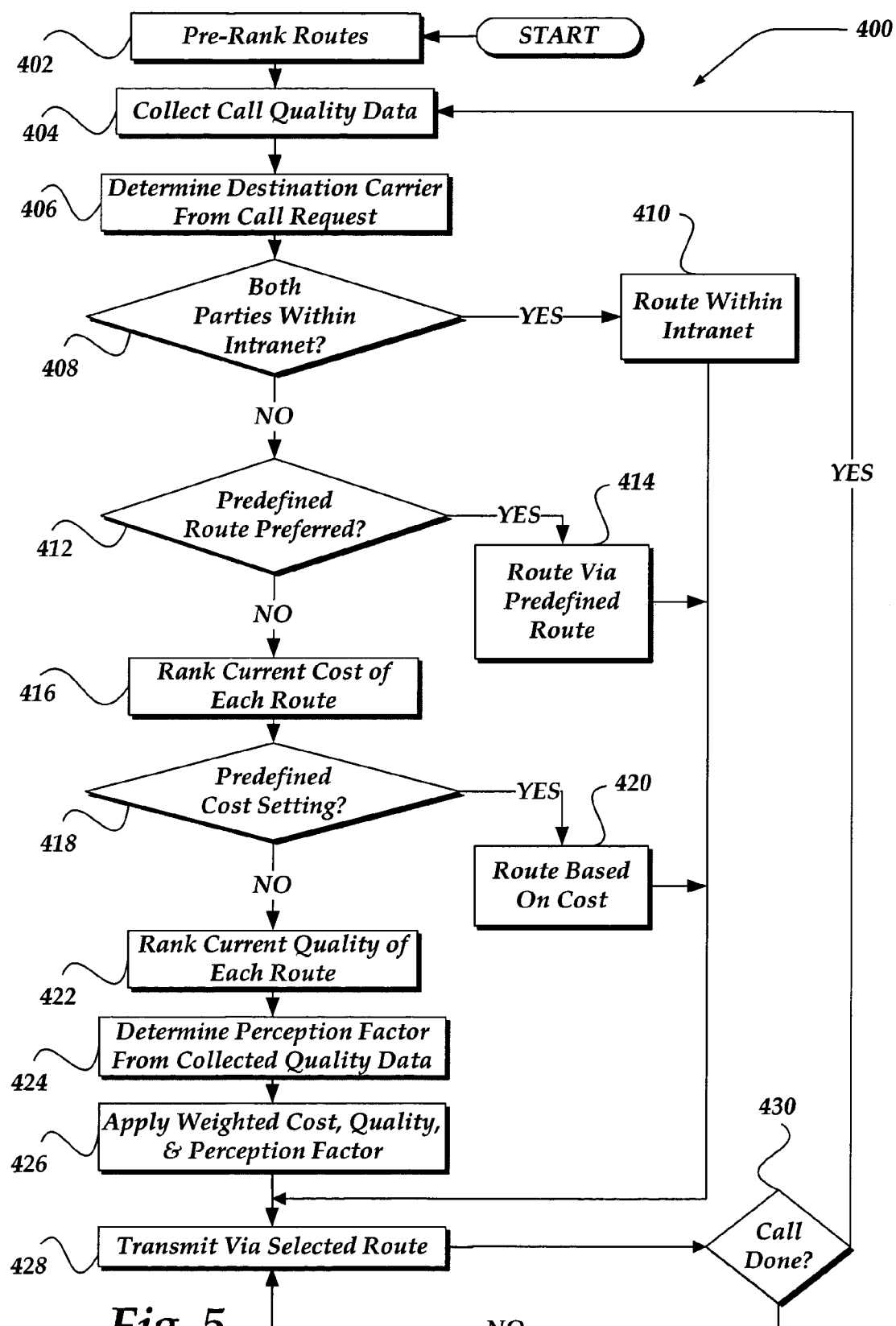
FIG. 5 illustrates a logical flow diagram generally showing one embodiment of a process for selecting a network routing based on current and past performance metrics.

The operation of certain aspects of the invention will now be described with respect to FIG. 5. FIG. 5 illustrates a logical flow diagram generally showing one embodiment of a server process for selecting a routing for a VOIP call. Process 400 begins, after a start block, at block 402, where routing services of peering partners, backbones, client carries, the PSTN(s), and the like are ranked based on known quality data, test data, financial agreements and/or other information known about the services of the various routes. This initial ranking may be performed upon start-up of the routing system, upon a change in the number of routing systems available, at periodic intervals, and/or at other times. At block 404, the user manager and/or other portions of the VOIP system begin to monitor the peering partners, backbones, client carries, and other routing services to collect quality data. The VOIP system may measure traffic levels, latencies, packet losses, and other quality of service levels at various times and dates for each routing service. The VOIP system also begins to accumulate call quality evaluations of VOIP calls handled by the VOIP system. For example, if a call terminates within approximately five seconds of connecting the caller to the destination, it can be assumed that the call was unsatisfactory to the parties, and they hung up. This would be assigned a poor quality value, and stored as a data point in a running history of the routing service(s) involved. When the VOIP system initially begins operation, there will be no accumulated data. However, as call volume increases and the VOIP system accumulates call quality feedback, the user manager may aggregate the call quality feedback and determine averages and/or other statistical values.

Processing flows to block 406 where an incoming call is detected and a destination service is determined. An incoming VOIP call identifies a source and a destination telephone number, IP address, and/or other destination identifier. Many carriers, ISPs, and/or other services have a predefined range of telephone numbers, addresses, or other identifiers. The VOIP system can perform a look-up or otherwise determine the range in which the source and/or destination identifier falls, and determine the corresponding carrier, ISP, or other service. The source and/or destination identifier may also be associated with a user identification (ID), such as a portal user ID or other VOIP provider ID. The VOIP system may determine the corresponding user ID, and obtain a profile of information about the caller and/or destination user. The information may include preferences, restrictions, and/or other criterion regarding routing VOIP calls.

Processing flows to decision block 408 where a determination is made whether an initiated VOIP call is between parties that are within the intranet. For example, when a caller requests a VOIP connection through the VOIP system to a destination, the VOIP system may determine whether the caller and the destination have user IDs or other identifiers that indicate that both parties are within the intranet. In that case, processing flows to block 410 for routing within the intranet; otherwise, processing continues to decision block 412.

The caller, destination, and/or VOIP system may have predefined routing preferences and/or requirements based on dedicated communication lines, commercial agreements, and/or other criteria. Profile information associated with the caller, the destination, and/or the VOIP system may indicate that certain VOIP calls should be routed with particular routing services. For example, if the destination telephone number is determined to fall within the range of numbers associated with a peering partner that has dedicated communication lines for exclusive use by the portal service, and a user profile associated with the destination number indicates that the user prefers routing directly through the peering partner, the VOIP system may route the call through the peering partner without analyzing other routing services. This is illustrated by block 414 at which the VOIP system routes the call via the predefined route.

Similarly, the VOIP system may have predefined routing requirements based on predefined and/or current routing costs. The VOIP system may monitor the routing services for current cost data based on time of day, day of week, holidays, geographic region, distance of call, and the like. With this data, the VIOP system ranks each routing service by cost at block 416. At decision block 418, a determination is made whether a predefined setting requires routing based strictly on cost. The decision may be for the cheapest cost, a predefined contract cost with a specific routing service, and/or other cost criteria. If a predefined cost requirement is set, processing flows to block 420 to route the current call based on cost.

Otherwise, processing continues to block 422, at which the VOIP system may monitor current quality of service characteristics and rank each routing service's current quality level. The VOIP system may measure, or otherwise obtain, traffic levels, latencies, packet losses, and/or other quality of service levels to determine a current quality level for each routing service. At block 424, the VOIP system also determines a perception factor based on accumulated call quality feedback for each routing service. The perception factor may comprise a running average, a median, and/or other statistical measure of an aggregate of quality data obtained after each call. The perception factor will also generally reflect aggregate data that is relevant to the current call, such as aggregate data near the same time of day, same period of the year, same holiday if applicable, same geographic region, and/or other relevant characteristics.

Processing then continues to block 426 in which the VOIP system applies weights to the current cost, current quality, and perception factor. For example, when the VOIP system initially begins operating, the perception factor will have a low weight, since there will be little quality feedback data accumulated. However, as call quality feedback is accumulated, the weight of the perception factor may increase, while the weights of the current cost and current quality data may decrease. The transition may be based on a volume of call quality feedback, a duration of feedback collection, and/or other factors. The weights may affect an overall ranking of the routing services.

At block 428, the VOIP system determines the highest ranked routing service and may also consider user settings or administrator settings to select a routing service over which to route the current VOIP call. Once selected, the VOIP system sets the routing for the call to the selected routing service, and transmits the corresponding VOIP packets via the selected routing service at block 428. Packets continue transmission via the selected routing service until a determination is made at decision block 430 that the call has ended. When the call ends, processing returns to block 404 to collect quality feedback about the ended call and await another call request.

The above specification, examples, and data provide a complete description of the manufacture and use, but those of skill in the art will recognize certain modifications, permutations, additions, and sub-combinations thereof. For example, audio instant messages or other audio data may be routed in packets other than VOIP packets. Alternatively, or in addition, audio data may be converted to VOIP packets for routing. Since many embodiments of the invention can be made without departing from the spirit and scope of the invention, the invention resides in the claims hereinafter appended and claims hereafter introduced.

What is claimed as new and desired to be protected by Letters Patent of the United States is:

1. A method for use in routing Voice over IP (VOIP) packets over a network, comprising:
   determining a perception factor based on call quality feedback for each of a plurality of routing services;
   determining a current cost and a current quality of service for each of the plurality of routing services;
   selecting one of the plurality of routing services based on the current cost, the current quality of service, and the perception factor; and
   routing the VOIP packets over the selected routing service.

2. The method of claim 1, wherein a routing service of the plurality of routing services comprise at least one of the following; a peering partner, an internet service provider (ISP), an internet backbone network, a carrier network, and a public switched telephone network (PSTN).

3. The method of claim 1, wherein the VOIP packets employ at least one of the following; a Session Initiation Protocol (SIP) and a Real-time Transport Protocol (RTP) format.

4. The method of claim 1, further comprising applying a first weight to the perception factor, a second weight to the current cost, and a third weight to the current quality of service.

5. The method of claim 4, wherein the first weight changes relative to a quantity of call quality feedback.

6. The method of claim 1, further comprising:
   receiving a request from a source client device to initiate VOIP communication with a destination client device;
   determining a destination identification (ID) associated with the destination client device;
   determining a routing service associated with the destination ID; and
   determining whether a predefined preference exists to route the VOIP packets to the routing service associated with the destination ID.

7. The method of claim 1, further comprising:
   receiving a request from a source client device to initiate VOIP communication with a destination client device;
   determining whether the source client device is associated with a first online portal identification (ID);
   accessing a first profile associated with the first online portal ID if the source client device is associated with the first online portal ID;
   determining whether the destination client device is associated with a second online portal ID;
   accessing a second profile associated with the second online portal ID if the destination client device is associated with the second online portal ID; and
   selecting the one of the plurality of routing services based further on at least one of the following; the first profile and the second profile.

8. The method of claim 1, further comprising:
   detecting an end to a VOIP call in which the VOIP packets were routed over the selected routing service;
   determining a quality of the VOIP call; and
   storing the quality for use in determining the perception factor.

9. The method of claim 1, wherein the perception factor is further determined based on at least one of the following; a time of day, a day of week, a day of year, and a geographic area.

10. The method of claim 1, wherein the VOIP packets are intended for receipt by a destination device, the destination device being a mobile device.

11. The method of claim 1, wherein the method is implemented as computer-readable instructions stored within a memory of a server, and the VOIP packets originate from a mobile device.

12. A server for use in routing Voice over IP (VOIP) packets over a network, comprising:
   a transceiver for receiving and sending packets to another computing device;
   a processor in communication with the transceiver; and
   a memory in communication with the processor and for use in storing data and machine instructions that causes the processor to perform a plurality of operations, including:
   receiving a VOIP packet from a source device, the VOIP packet being destined for a destination device, and is configured to employ a Transmission Control Protocol (TCP) transport protocol;
   determining a perception factor based on call quality feedback for each of a plurality of routing services;
   determining a current cost and a current quality of service for each of the plurality of routing services;
   selecting one of the plurality of routing services based on the current cost, the current quality of service, and the perception factor; and
   routing the VOIP packets over the selected routing service via the transceiver.

13. The server of claim 12, wherein a routing service of the plurality of routing services is in communication with the transceiver and comprise at least one of the following; a peering partner, an internet service provider (ISP), an internet backbone network, a carrier network, and a public switched telephone network (PSTN).

14. The server of claim 13, wherein the received VOIP packet employs at least one of a Session Initiation Protocol (SIP) or a Real-time Transport Protocol (RTP).

15. The server of claim 12, wherein the machine instructions further causes the processor to perform the operation of applying a first weight to the perception factor, a second weight to the current cost, and a third weight to the current quality of service.

16. The server of claim 15, wherein the first weight changes relative to a quantity of call quality feedback.

17. The server of claim 12, wherein the machine instructions further causes the processor to perform the operations of:
   receiving a request from a source client device to initiate VOIP communication with a destination client device;
   determining a destination identification (ID) associated with the destination client device;
   determining a routing service associated with the destination ID; and
   determining whether a predefined preference exists to route the VOIP packets to the routing service associated with the destination ID.

18. The server of claim 12, wherein the machine instructions further causes the processor to perform the operations of:
   receiving a request from a source client device to initiate VOIP communication with a destination client device;
   determining whether the source client device is associated with a first online portal identification (ID);
   accessing a first profile associated with the first online portal ID if the source client device is associated with the first online portal ID;
   determining whether the destination client device is associated with a second online portal ID;
   accessing a second profile associated with the second online portal ID if the destination client device is associated with the second online portal ID; and
   selecting the one of the plurality of routing services based further on at least one of the following; the first profile and the second profile.

19. The server of claim 12, wherein the machine instructions further causes the processor to perform the operations of:
   detecting an end to a VOIP call in which the VOIP packets were routed over the selected routing service;
   determining a quality of the VOIP call; and
   storing the quality for use in determining the perception factor.

20. The relay server of claim 12, wherein the server comprises an online portal.

21. A system for use in routing Voice over IP (VOIP) packets over a network, comprising:
   a client device that is configured to perform actions, including requesting a VOIP call through a portal service to a destination device;
   a server in communication with the client device and the destination device and configured to perform actions, including:
   determining a perception factor based on call quality feedback for each of a plurality of routing services;
   determining a current cost and a current quality of service for each of the plurality of routing services;
   selecting one of the plurality of routing services based on the current cost, the current quality of service, and the perception factor; and
   routing the VOIP packets over the selected routing service.

22. An apparatus for routing Voice over IP (VOIP) packets over a network, comprising:
   a transceiver for receiving and sending packets to a computing device over the network;
   means for determining a perception factor based on call quality feedback for each of a plurality of routing services;
   means for determining a current cost and a current quality of service for each of the plurality of routing services;
   means for selecting one of the plurality of routing services based on the current cost, the current quality of service, and the perception factor; and
   means for routing the VOIP packets over the selected routing service.

23. A method for use in routing audio data packets over a network, comprising:
   determining a perception factor based on audio quality feedback for each of a plurality of routing services;
   determining a current cost and a current quality of service for each of the plurality of routing services;
   selecting one of the plurality of routing services based on the current cost, the current quality of service, and the perception factor; and routing the audio data packets over the selected routing service.

24. The method of claim 23, wherein the audio data packets comprise voice over internet protocol (VOIP) packets.

25. The method of claim 1, wherein a particular perception factor is based on an aggregate of a plurality of accumulated call quality feedback for a particular routing service.

26. The method of claim 1, wherein a particular call quality feedback is an estimation of a party's satisfaction of a VOIP call.

* * * * *

UNITED STATES PATENT AND TRADEMARK OFFICE
CERTIFICATE OF CORRECTION

| | | |
|---|---|---|
| PATENT NO. | : 7,313,133 B2 | Page 1 of 1 |
| APPLICATION NO. | : 11/128519 | |
| DATED | : December 25, 2007 | |
| INVENTOR(S) | : Yarlagadda | |

It is certified that error appears in the above-identified patent and that said Letters Patent is hereby corrected as shown below:

In column 1, line 55, after "invention;" delete "and".

In column 10, line 21, delete "VO1P" and insert -- VOIP --, therefor.

Signed and Sealed this

Twenty-ninth Day of April, 2008

JON W. DUDAS
*Director of the United States Patent and Trademark Office*